US010708719B2

(12) United States Patent
Misumi et al.

(10) Patent No.: US 10,708,719 B2
(45) Date of Patent: Jul. 7, 2020

(54) MATCHING DEVICE, TERMINAL, SENSOR NETWORK SYSTEM, MATCHING METHOD, AND MATCHING PROGRAM

(71) Applicant: OMRON Corporation, Kyoto-shi, Kyoto (JP)

(72) Inventors: Shuichi Misumi, Kyoto (JP); Tetsuji Yamato, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/346,143

(22) PCT Filed: Oct. 25, 2017

(86) PCT No.: PCT/JP2017/038426
§ 371 (c)(1),
(2) Date: Apr. 30, 2019

(87) PCT Pub. No.: WO2018/100925
PCT Pub. Date: Jun. 7, 2018

(65) Prior Publication Data
US 2020/0059756 A1    Feb. 20, 2020

(30) Foreign Application Priority Data

Dec. 2, 2016    (JP) ................................ 2016-234677

(51) Int. Cl.
*H04W 24/00*    (2009.01)
*H04W 4/029*    (2018.01)
*H04W 4/38*    (2018.01)
(52) U.S. Cl.
CPC ............. *H04W 4/029* (2018.02); *H04W 4/38* (2018.02)

(58) Field of Classification Search
CPC ................................ H04W 4/029; H04W 4/38
(Continued)

(56) References Cited

U.S. PATENT DOCUMENTS 9,942,533 B2 *    4/2018    Sathish .............. H04N 21/2343
2004/0046779 A1    3/2004    Asano et al.
(Continued)

FOREIGN PATENT DOCUMENTS

JP    2006-351024 A    12/2006
JP    2011-014022 A    1/2011
(Continued)

OTHER PUBLICATIONS

Extended European search report (EESR) dated Nov. 4, 2019 in a counterpart European patent application.
(Continued)

*Primary Examiner* — Amancio Gonzalez
(74) *Attorney, Agent, or Firm* — Metrolex IP Law Group, PLLC

(57) ABSTRACT

A provider-side metadata acquisition part acquires provider-side metadata regarding a sensing data providing terminal. The provider-side metadata includes a current position of the sensing data providing terminal. Also, the user-side metadata acquisition part acquires user-side metadata regarding sensing data using terminal. A matching part performs matching with the user-side metadata, using the current position of the sensing data providing terminal included in the provider-side metadata and the current time, and decides whether to request the sensing data providing terminal to provide the sensing data. A request part requires the sensing data providing terminal to provide the sensing data in accordance with the decision by the matching part.

19 Claims, 11 Drawing Sheets

(58) Field of Classification Search
USPC .................................................. 455/456.1
See application file for complete search history.

(56) References Cited

U.S. PATENT DOCUMENTS

2008/0243440 A1\* 10/2008 Matsumoto ............. H04L 41/50
702/188
2014/0372561 A1 12/2014 Hisano

FOREIGN PATENT DOCUMENTS

JP          5445722 B1    3/2014
WO       2015182416 A1   12/2015

OTHER PUBLICATIONS

Katsuya Matsumoto et al., "Low Server-load Onboard Camera Image Delivery Scheme Based on a Cellular Network and Cooperation of Neighboring Vehicles through Vehicle-to-vehicle Communication", Information Processing Society of Japan ed. Journal of Information Processing (JIP), Nov. 15, 2015, pp. 2106-2116, vol. 56, No. 11; relevance is indicated in the (translated)ISR/WO mailed on Nov. 28, 2017.
English translation of the International Search Report("ISR") of PCT/JP2017/038426 dated Nov. 28, 2017.
Written Opinion("WO") of PCT/JP2017/038426 dated Nov. 28, 2017.

\* cited by examiner

FIG. 3

Provider-side metadata

| Terminal ID | Type | Sensing area | Start time | Current position | Destination | Moving means | Type of acquirable sensing data | |
|---|---|---|---|---|---|---|---|---|
| ○ ○ ○ | ○ ○ ○ | ○ ○ ○ | ○ ○ ○ | ○ ○ ○ | ○ ○ ○ | ○ ○ ○ | ○ ○ ○ | ○ ○ ○ |
| 0001234 | Mobile | — | 12:00 | Point X | Point x | Foot | Image data, Temperature data, Five-sense data | ○ ○ ○ |
| 0001235 | Stationary | Area A | — | — | — | — | Image data | ○ ○ ○ |
| 0001236 | Mobile | — | 13:05 | Point Y | Point y | Bicycle | Image data, Noise data, Five-sense data | ○ ○ ○ |
| 0001237 | Mobile | — | 12:35 | Point Z | Point z | Bicycle | Image data, Speed data, Five-sense data | ○ ○ ○ |
| ○ ○ ○ | ○ ○ ○ | ○ ○ ○ | ○ ○ ○ | ○ ○ ○ | ○ ○ ○ | ○ ○ ○ | ○ ○ ○ | ○ ○ ○ |

FIG. 4

User-side metadata

| Terminal ID | Sensing data acquisition position | Sensing data acquisition time | Type of sensing data | Content of sensing | |
|---|---|---|---|---|---|
| ○ ○ ○ | ○ ○ ○ | ○ ○ ○ | ○ ○ ○ | | ○ ○ ○ ○ |
| 1001234 | Point P | 12:00 | Image data | Congestion status (e.g. Wait time) at counter of AA Office | ○ ○ ○ ○ |
| 1001235 | Point Q | 12:15 | Noise data | Noise level at BB performance | ○ ○ ○ ○ |
| 1001236 | Point R | 13:05 | Five-sense data | Congestion level at CC street | ○ ○ ○ ○ |
| 1001237 | Point S | 12:35 | Speed data | Traffic congestion level around DD intersection | ○ ○ ○ ○ |
| ○ ○ ○ | ○ ○ ○ | ○ ○ ○ | ○ ○ ○ | ○ ○ ○ | ○ ○ ○ ○ |

MATCHING DEVICE, TERMINAL, SENSOR NETWORK SYSTEM, MATCHING METHOD, AND MATCHING PROGRAM

TECHNICAL FIELD

The present invention relates to a technology for requesting a sensing data provider to provide sensing data in accordance with a user's needs.

RELATED ART

Conventionally, there are sensor network systems for connecting a provider that provides sensing data with users that use the sensing data via a network. In such a sensor network system, the provider acquires sensing data and uploads the data to a center, and the users download the sensing data that has been uploaded to the center as needed and use the data.

Also, a technology has been proposed in which matching (collation) is performed between sensor-side metadata that is information regarding sensors (on the provider side) for outputting sensing data and application-side metadata that is information regarding an application (on the user side) for providing a service or the like using the sensing data, a sensor that can provide sensing data that satisfies the needs of the application is extracted, and the sensing data acquired by the extracted sensor is distributed to the application (see Patent Document 1). According to the configuration disclosed in Patent Document 1, sensing data that satisfies the user needs can be provided to the user.

RELATED ART DOCUMENTS

Patent Documents

Patent Document 1: JP 5445722B

SUMMARY OF THE INVENTION

Problem to be Solved by the Invention

However, Patent Document 1 assumes that the provider-side sensors that can provide sensing data that satisfies the user's needs have been already installed. In other words, if the provider-side sensors that can provide sensing data that satisfies the user's needs are not installed, it is not possible to provide sensing data that satisfies the user's needs to the user.

In addition, it takes time and cost to install the provider-side sensors that can provide sensing data that satisfies the user's needs.

An object of the present invention is to provide a technology for providing sensing data that satisfies the user's needs even in a situation where sensors that can provide sensing data that satisfies the user's needs are not installed.

Means for Solving the Problems

In order to achieve the above-described object, a matching apparatus according to the present invention is configured as follows.

A provider-side metadata acquisition part acquires provider-side metadata regarding a first terminal that provides sensing data. A user-side metadata acquisition part acquires user-side metadata regarding sensing data that is to be used by a second terminal. The provider-side metadata includes at least a current position of the first terminal. The user-side metadata includes, for example, a content of sensing data, a sensing data acquisition position, and a sensing data acquisition time.

A matching part performs matching with the user-side metadata using the current position of the first terminal and the current time, and decides whether to request the first terminal to provide the sensing data. The matching part decides whether to request the first terminal to provide the sensing data, for example, on the basis of whether the first terminal can reach the sensing data acquisition position included in the user-side metadata by the sensing data acquisition time.

A configuration is also possible in which a movement schedule of the first terminal is included in the provider-side metadata, and matching with the user-side metadata is performed using the position and time, at which the first terminal will pass, acquired from this movement schedule. In this case, the matching part needs only to determine to request the first terminal to provide the sensing data if the difference in time between the time when the first terminal reaches a position, where the distance of the first terminal from the sensing data acquisition position included in the user-side metadata is shorter than or equal to a first setting distance, and the sensing data acquisition time included in the user-side metadata is within a first setting time period. A request part requests the first terminal to provide the sensing data in accordance with the decision by the matching part. When the request part requests the first terminal to provide the sensing data in accordance with the decision by the matching part, the request part needs only to notify the first terminal of the user-side metadata including the content of the sensing data, the sensing data acquisition position, the sensing data acquisition time, and the like.

According to this configuration, it is possible to request provision of the sensing data to a first terminal located near the acquisition position of this sensing data (e.g. terminal attached to a mobile phone or a moving body) around the acquisition time of the sensing data that is to be used by the second terminal. Accordingly, sensing data that satisfies the user's needs can be provided even in a situation where sensors that can provide sensing data that satisfies the user's needs are not installed.

It is also possible to prevent making a request to a first terminal that cannot provide sensing data that satisfies the user's needs. In the other words, making an unnecessary request to the first terminal to provide the sensing data can be prevented, a load required for communication with the first terminal can be thus suppressed, and occurrence of a communication error can be also suppressed.

In addition, a configuration is also possible in which a user-side metadata storage part is provided for storing the user-side metadata regarding sensing data used by the second terminal, and the user-side metadata acquisition part reads out the user-side metadata from the user-side metadata storage part.

Furthermore, a configuration is also possible in which a communication unit for receiving the user-side metadata regarding the sensing data used by the second terminal, that has been transmitted from the second terminal is provided. In this case, the user-side metadata acquisition part may also acquire, as the user-side metadata, the user-side metadata received by the communication unit. Furthermore, the user-side metadata acquisition part may also temporarily store, in the user-side metadata storage unit, the user-side metadata received by the communication unit.

Furthermore, a configuration is also possible in which, the request part separately request the first terminal to provide a first sensing data in which the difference in time between the time when the first terminal reaches a position, where the distance of the first terminal from the sensing data acquisition position included in the user-side metadata is shorter than or equal to a second setting distance which is shorter than a first setting distance, and the sensing data acquisition time included in the user-side metadata, is within a second setting time period which is shorter than a first setting time period, and a second sensing data that is other than the first sensing data. With this configuration, it is possible to separately request the first terminal to provide sensing data (first sensing data) which can be smoothly acquired while the first terminal moves according to the movement schedule, and sensing data (second sensing data) that requires taking a bit of detour, moving in a bit of hurry, waiting for a little while, in order to be acquired.

Also, due to the first terminal displaying the first sensing data and the second sensing data separately, it is possible to easily make the owner of the first terminal recognize which of the first sensing data or the second sensing data is the sensing data which is requested to be provided.

Effects of the Invention

According to the present invention, sensing data that satisfies user's needs can be provided even in a situation where sensors that can provide sensing data that satisfies the user's needs are not installed.

BRIEF DESCRIPTION OF THE DRAWINGS

FIG. 3 is a diagram showing provider-side metadata stored in a provider-side metadata storage unit.

FIG. 4 is a diagram showing a user-side metadata stored in a user-side metadata storage unit.

EMBODIMENTS OF THE INVENTION

Hereinafter, an embodiment of the present invention will be described.

Figure 1:
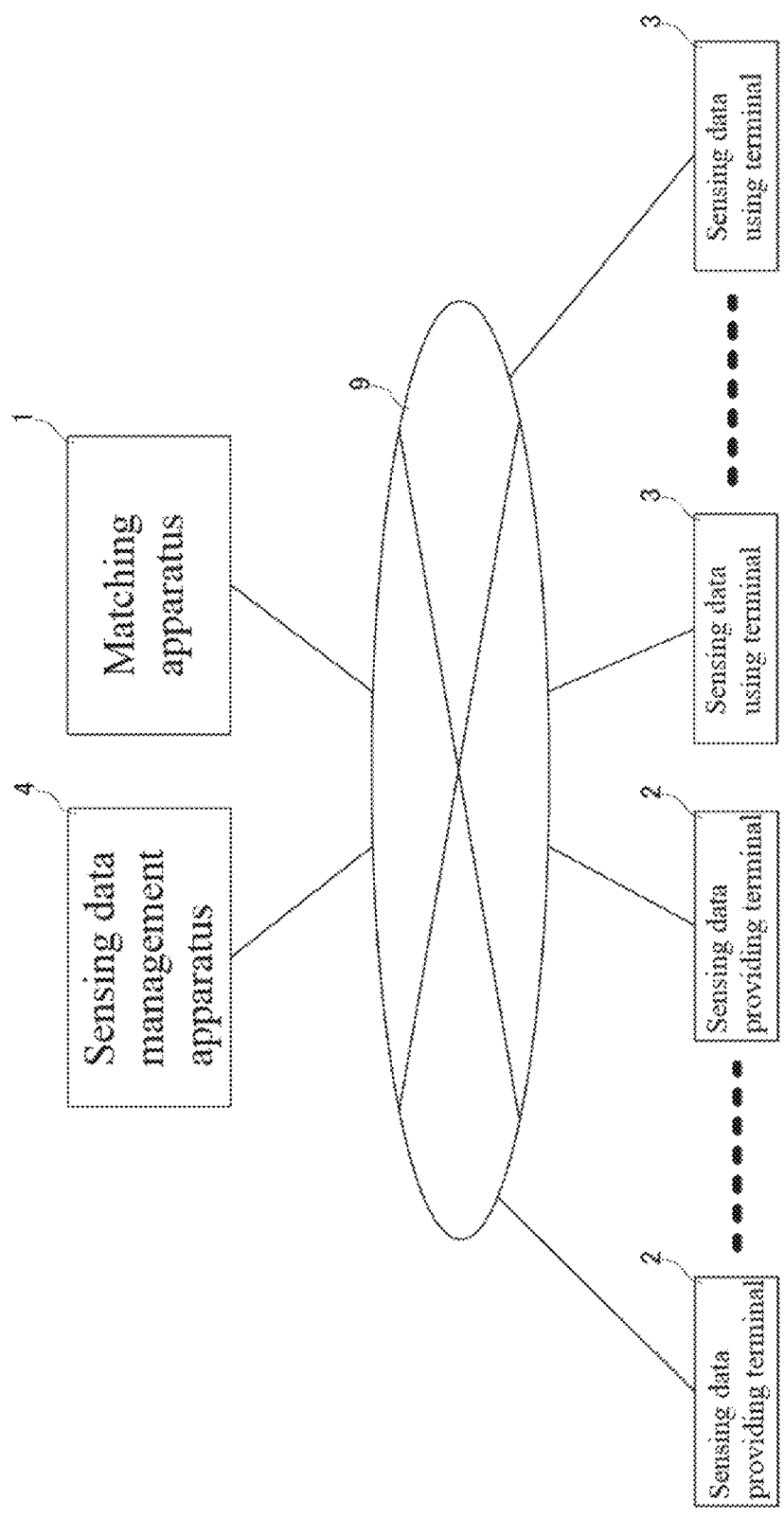
FIG. 1 is a diagram showing a schematic configuration of a sensor network system.

FIG. 1 is a diagram showing a schematic configuration of a sensor network system according to this example. This sensor network system includes a matching apparatus 1, a plurality of sensing data providing terminals 2, a plurality of sensing data using terminals 3, and a sensing data management apparatus 4. The matching apparatus 1, the sensing data providing terminals 2, the sensing data using terminals 3, and the sensing data management apparatus 4 are connected so as to be capable of communicating digitally with each other via a network 9.

The sensing data providing terminals 2 transmit (upload) sensing data to the sensing data management apparatus 4 via the network 9. The sensing data using terminals 3 receive (download) sensing data from the sensing data management apparatus 4 via the network 9. The sensing data management apparatus 4 provides the sensing data provided from the sensing data providing terminals 2 to the sensing data using terminals 3 as needed. The sensing data management apparatus 4 may also have a configuration in which a database for storing the sensing data provided from the sensing data providing terminals 2 is included or is not included. In other words, the sensing data management apparatus 4 relays sensing data between the sensing data providing terminals 2 and the sensing data using terminals 3.

Note, that although the sensing data providing terminals 2 and the sensing data using terminals 3 are illustrated separately in this example, the sensing data providing terminals 2 may also operate as the sensing data using terminals 3 in some cases, and the sensing data using terminals 3 may also operate as the sensing data providing terminals 2 in other cases. Also, this example will be described on the assumption that transmission and reception of sensing data via the network 9 will not be directly performed between the sensing data providing terminals 2 and the sensing data using terminals 3.

Each sensing data providing terminal 2 is a stationary terminal that is installed at a prescribed location in a facility, a mobile terminal attached to a moving body such as an automobile or an unmanned aircraft (e.g. a drone), or a mobile terminal carried by its owner. The sensing data providing terminal 2 includes one or more sensors (e.g. a GPS sensor, an image sensor, a temperature sensor, a humidity sensor, and an illuminance sensor) and can acquire sensing data sensed by the sensors. The sensors may be externally connected to or built into the sensing data providing terminal 2.

Each sensing data using terminal 3 is a stationary terminal that is installed at a prescribed location in a facility, a moving terminal attached to a moving body such as an automobile or an unmanned aircraft (e.g. a drone), a mobile terminal carried by its owner. The sensing data using terminal 3 may also utilize the acquired sensing data in an application program and the like.

Each first terminal according to the present invention is a moving terminal or a mobile terminal that belongs to the sensing data providing terminals 2. Here, the mobile terminal means a terminal such as a smartphone, a tablet terminal, or a mobile phone. A second terminal according to the present invention means the sensing data using terminal 3.

The matching apparatus 1 performs processing such that the sensing data using terminal 3 efficiently acquires sensing data used by the sensing data using terminal 3. For example, in response to a request for using the sensing data from the sensing data using terminal 3, the matching apparatus 1 requests the sensing data providing terminal 2 to acquire the sensing data.

Figure 2:
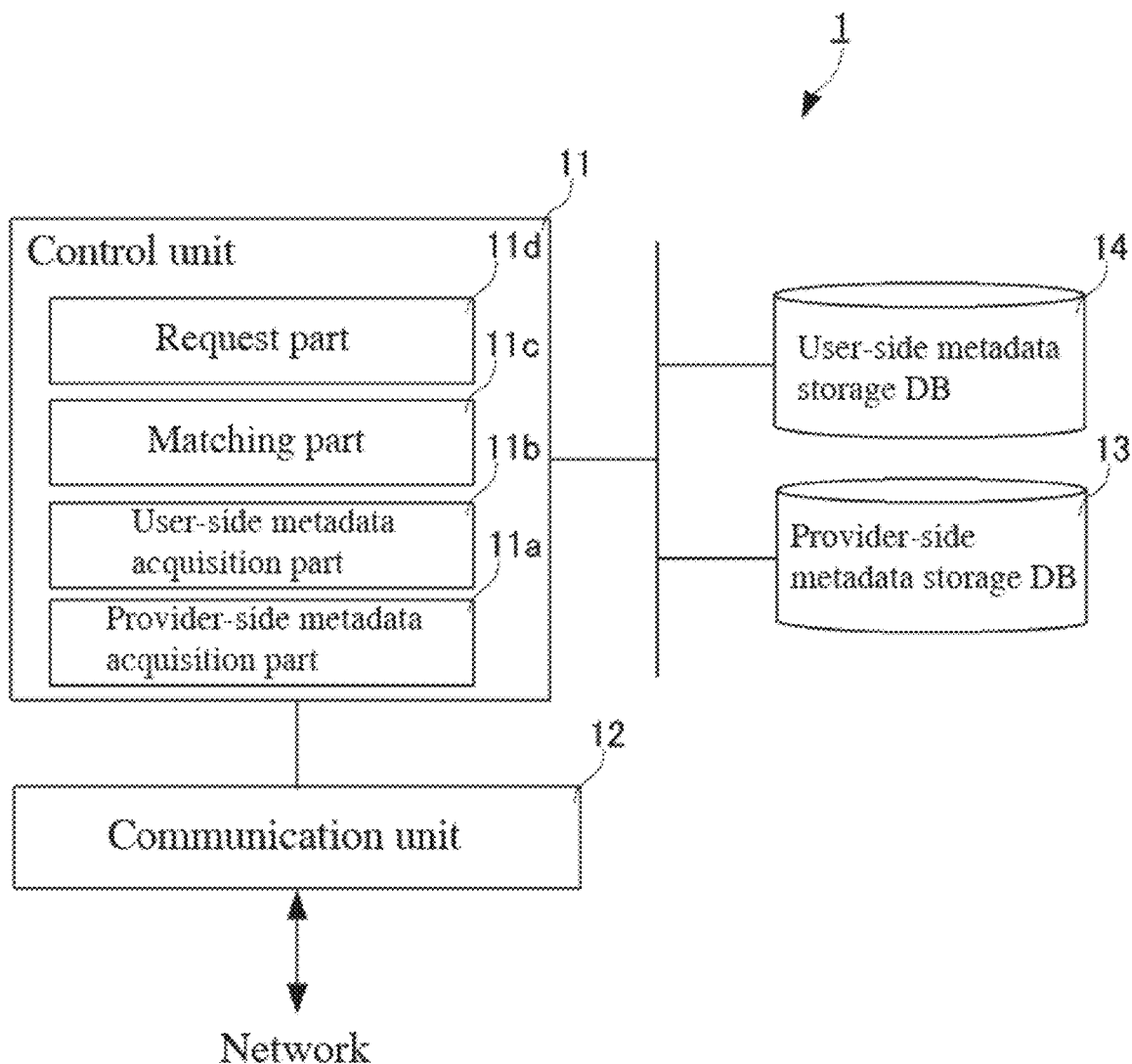
FIG. 2 is a block diagram showing a configuration of a main part of a matching apparatus.

FIG. 2 is a block diagram showing a configuration of a main part of a matching apparatus. The matching apparatus 1 includes a control unit 11, a communication unit 12, a provider-side metadata storage DB 13, and a user-side metadata storage DB 14. The control unit 11 controls the operation of the units of the main body of matching apparatus 1. Also, the control unit 11 includes a provider-side metadata acquisition part 11*a*, a user-side metadata acquisition part 11*b*, a matching part 11*c*, and a request part 11*d*. This control unit 11 performs matching according to the present invention. Furthermore, a matching program according to the present invention is installed in the control unit 11.

The control unit 11 is constituted by a hardware CPU, a memory, and other electrical circuits. The hardware CPU functions as the provider-side metadata acquisition part 11*a*, the user-side metadata acquisition part 11*b*, the matching part 11*c*, and the request part 11*d*. The memory includes regions such as a region for deploying the matching program according to the present invention and a region for temporarily storing data generated when the matching program is executed (including data read out from the provider-side metadata storage DB 13 and the user-side metadata storage DB 14 and the like). The control unit 11 may also be an LSI constituted by a hardware CPU, a memory, and the like being integrated into a single unit.

A provider-side metadata acquisition part 11*a* acquires provider-side metadata regarding the sensing data providing terminal 2 from the provider-side metadata storage DB 13. The provider-side metadata that is acquired by the provider-side metadata acquisition part 11*a* will be described in detail later.

The user-side metadata acquisition part 11*b* acquires the user-side metadata regarding the sensing data using terminal 3 from the user-side metadata storage DB 14. The user-side metadata that is acquired by the user-side metadata acquisition part 11*b* will be described in detail later.

The matching part 11*c* matches the provider-side metadata acquired by the provider-side metadata acquisition part 11*a* with the user-side metadata acquired by the user-side metadata acquisition part 11*b*, and decides whether to request the sensing data providing terminal 2 to provide the sensing data.

The request part 11*d* requests the provision of sensing data from the sensing data providing terminal 2 determined by the matching part 11*c*. Specifically, the request part 11*d* notifies the sensing data providing terminal 2 of the content of the sensing data to be acquired, and requests the sensing data providing terminal 2 to acquire and upload the sensing data.

A communication unit 12 performs data communication with the sensing data providing terminals 2, the sensing data using terminals 3, and the sensing data management apparatus 4, via the network 9.

The provider-side metadata storage DB 13 stores metadata regarding sensing data providing terminals 2 for each sensing data providing terminal 2 as the provider-side metadata. The provider-side metadata is data acquired regarding the sensing data providing terminal 2. FIG. 3 is a diagram showing provider-side metadata stored in a provider-side metadata storage unit. As shown in FIG. 3, the provider-side metadata is data in which "Terminal ID", "type", "sensing area", "start time", "current position", "destination", "moving means", "type of acquirable sensing data", and the like are registered for each sensing data providing terminal 2. The provider-side metadata may be input manually or downloaded from an external storage or the like. "Terminal ID" is for identifying the sensing data providing terminal 2. "Type" indicates whether the sensing data providing terminal 2 is a stationary terminal installed in the facility or the like, or a mobile terminal carried by the owner (a mobile terminal includes a terminal attached to a moving body).

"Sensing area" indicates the area where sensing can be performed by the stationary sensing data providing terminal 2. In a case where the sensing data which can be acquired by the sensing data providing terminal 2 is image data captured by an image capturing apparatus such as a camera, for example, the sensing area means the image-capturing area of the image capturing apparatus.

Note, that since the main body of the mobile sensing data providing terminal 2 moves, data regarding its "sensing area" is not registered.

"Start time", "current position", "destination", and "moving means" constitute a movement schedule of the sensing data providing terminal 2. More specifically, "start time", "current position", "destination", and "moving means" indicate the action schedule of the owner of the sensing data providing terminal 2, or the movement schedule of the moving body to which the sensing data providing terminal 2 is attached. "Start time" indicates the time when the owner or the moving body starts to move. "Current position" indicates the point (position) at which the owner or the moving body starts to move. "Destination" indicates the destination of the owner or the moving body. "Moving means" indicates the means (foot, bicycle, automobile, or the like) by which the owner or the moving body moves to the destination. The "moving means" of the sensing data providing terminal 2 attached to the moving body is the moving body itself.

"Type of acquirable sensing data" indicates sensing data that can be acquired by the sensing data providing terminal 2. Furthermore, "five-sense data" means data that is acquired by the owner of the sensing data providing terminal 2 or the like with five senses, namely, sight, hearing, smell, touch, taste, or the like.

The user-side metadata storage DB 14 stores metadata regarding the sensing data using terminals 3 for each of the sensing data using terminals 3, as user-side metadata. The user-side metadata indicates the sensing data which is requested to be used from the sensing data using terminal 3. The user-side metadata may be input manually or downloaded from an external storage or the like. FIG. 4 is a diagram showing user-side metadata stored in a user-side metadata storage unit. As shown in FIG. 4, the user-side metadata is data in which the "terminal ID", the "sensing data acquisition position", the "sensing data acquisition time", the "type of sensing data", "the content of the sensing data", and the like are associated with each of sensing data using terminals 3.

"Terminal ID" identifies the sensing data using terminal 3. "Sensing data acquisition position" designates the position at which the sensing data is acquired. "Sensing data acquisition time" designates the time when the sensing data is acquired. "Type of sensing data" indicates the type of the sensing data that is used by the sensing data using terminal 3. "Content of sensing" indicates the purpose of use, application, and the like of the sensing data.

Figure 5:
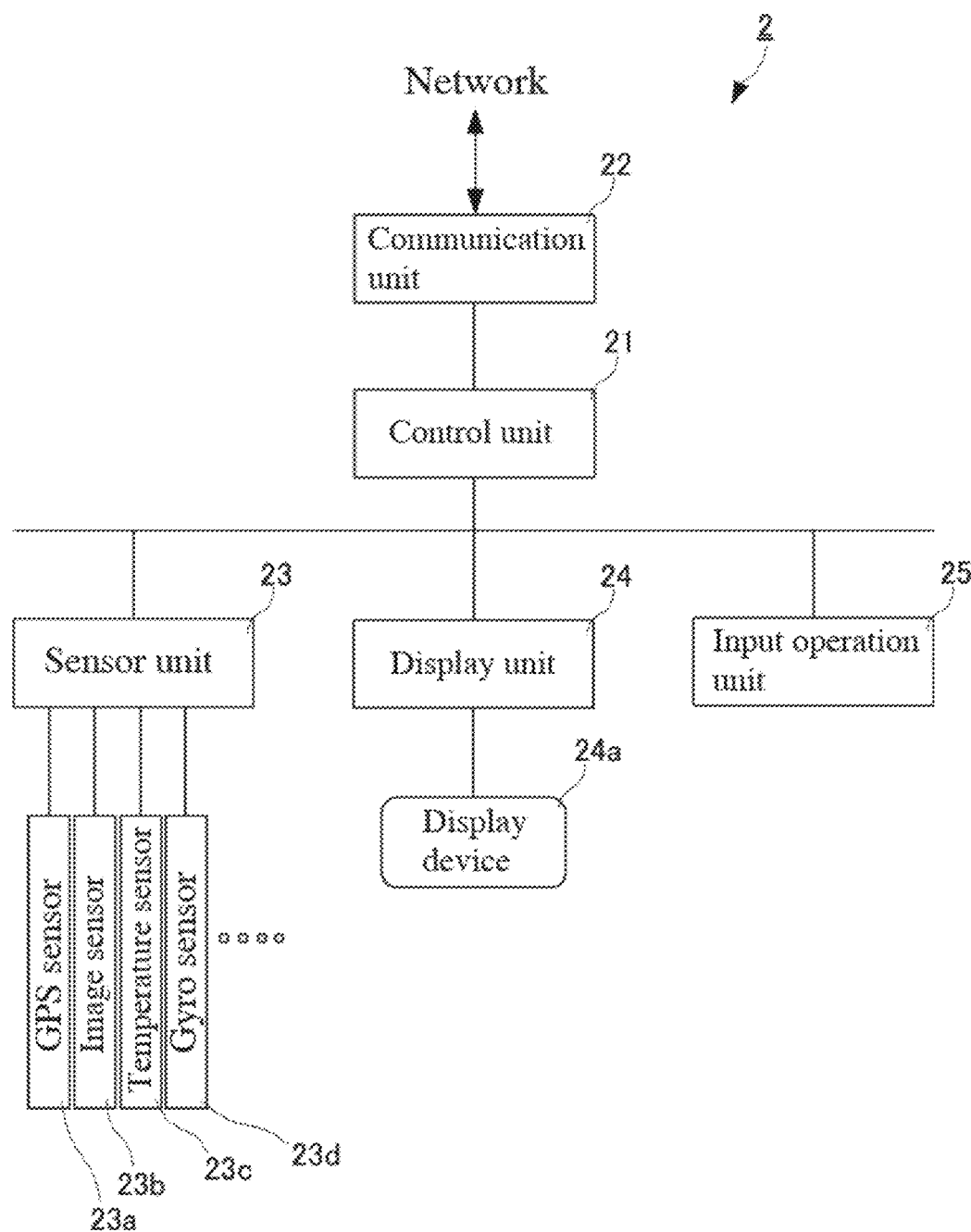
FIG. 5 is a diagram showing a configuration of a main part of a mobile sensing data providing terminal.

FIG. 5 is a diagram showing a configuration of a main part of a sensing data providing terminal. The sensing data providing terminal 2 shown in FIG. 5 is a known mobile terminal such as a smartphone, a tablet, or a mobile phone. The sensing data providing terminal 2 includes a control unit 21, a communication unit 22, a sensor unit 23, a display unit 24, and an input/operation unit 25.

The control unit 21 controls the operation of the units of the main body of the sensing data providing terminal 2. The communication unit 22 performs data communication with the matching apparatus 1, the sensing data management apparatus 4, and the like, via the network 9.

Various types of sensors such as a GPS sensor 23a, an image sensor 23b, a temperature sensor 23c, and a gyro sensor 23d are connected to a sensor unit 23. The sensor unit 23 processes the output of the sensors connected thereto. The sensor unit 23 processes, for example, the output of the GPS sensor 23a to acquire the current position of the terminal. Also, the sensor unit 23 processes the output of the image sensor 23b to acquire the image of the area to be imaged. Also, the sensor unit 23 processes the output of the temperature sensor 23c to acquire the temperature around the terminal. Also, the sensor unit 23 processes output of the gyro sensor 23d to acquire the rotation speed of the terminal. The sensors connected to the sensor unit 23 are not limited to the sensors (the GPS sensor 23a, the image sensor 23b, the temperature sensor 23c, the gyro sensor 23d) shown in FIG. 5, and may also include other types of sensors (e.g. an illuminance sensor, and a vibration sensor). Furthermore, a configuration is also possible in which some of the sensors shown in FIG. 5 are not connected to the sensor unit 23.

The display unit 24 controls the screen display in the display device 24a. The input operation unit 25 includes an input device such as a touch panel mounted on the screen of the display device 24a, and receives input operations performed on the main body of the sensing data providing terminal 2. The input device may also be separate from the display device 24a.

Note, that the moving terminal has the same configuration as the mobile terminal shown in FIG. 5. The stationary sensing data providing terminal 2 can be realized by, for example, an information processing apparatus such as a work station and a personal computer, to which various types of sensors such as a GPS sensor 23a, an image sensor 23b, a temperature sensor 23c, and a gyro sensor 23d are connected. Since the stationary sensing data providing terminal 2 can be realized by a known device, its detailed description will not be given here. Also, the sensing data using terminal 3 can also be realized by a known information processing apparatus such as a mobile terminal, a work station, or a personal computer. Since the sensing data using terminal 3 can be realized by a known device, its detailed description will not be given here.

Figure 6:
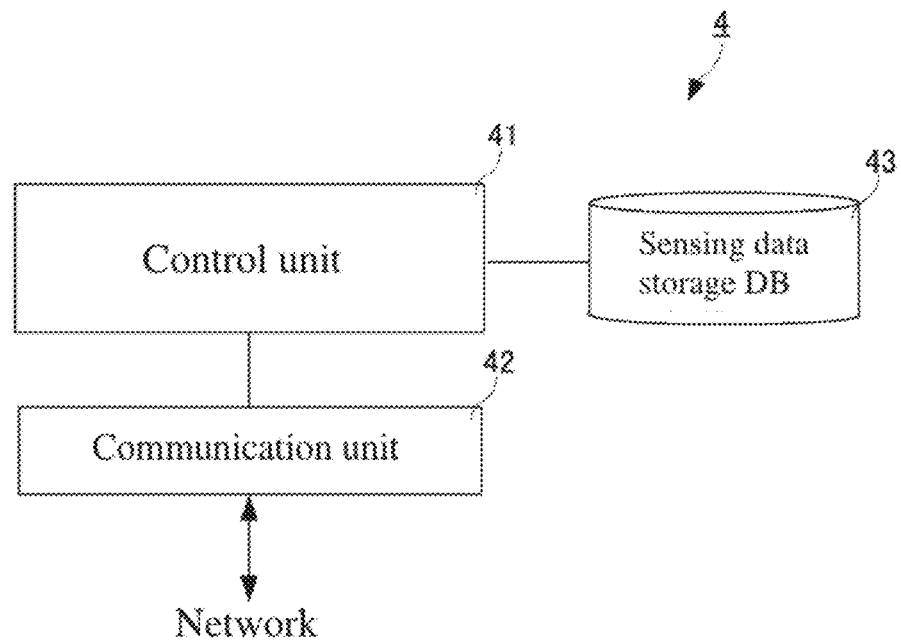
FIG. 6 is a block diagram showing a configuration of a main part of a sensing data management apparatus.

FIG. 6 is a diagram showing a configuration of a main part of a sensing data management apparatus. The sensing data management apparatus 4 includes a control unit 41, a communication unit 42, and a sensing data storage DB 43. The control unit 41 controls the operation of the units of the main body of the sensing data management apparatus 4. The communication unit 42 performs data communication with the matching apparatus 1, the sensing data providing terminals 2, and the sensing data using terminals 3 via the network 9.

The sensing data storage DB 43 is a database that accumulatively stores sensing data provided from the sensing data providing terminals 2. The sensing data providing terminal 2 transmits, to the sensing data management apparatus 4, the terminal ID for identifying itself, the type of sensing data, the acquisition place, acquisition date and time, and the like of the sensing data, and the like along with the sensing data to be provided. The sensing data storage DB 43 stores the terminal ID, the type of sensing data, the acquisition place, the acquisition date and time, and the like of the sensing data in association with the sensing data provided from the sensing data providing terminals 2.

Note, that at least one of the matching apparatus 1 and the sensing data management apparatus 4 may store contract data in which the terminal ID is associated with information regarding the owner (address, name, provision points regarding provision of sensing data, use points regarding use of sensing data, or the payment for provision and use of sensing data) for each of the sensing data providing terminals 2 and the sensing data using terminals 3.

Note, that although the matching apparatus 1 and the sensing data management apparatus 4 are connected to each other via the network 9 in this example, the matching apparatus 1 and the sensing data management apparatus 4 may also be connected to each other by wire or wirelessly without interposing the network 9, or the two apparatuses may also be constituted by a single apparatus.

Figure 7:
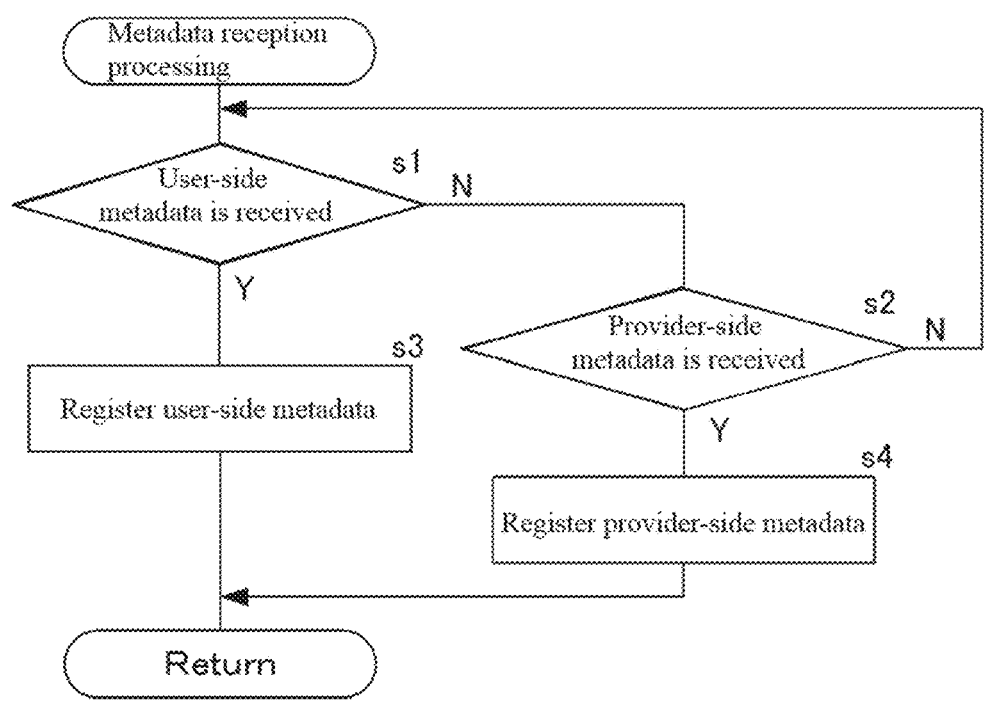
FIG. 7 is a flowchart showing metadata reception processing performed by the matching apparatus.

Hereinafter, the operation of the sensor network system according to this example will be illustrated. FIG. 7 is a flowchart showing metadata reception processing performed by the matching apparatus. The matching apparatus 1 waits for the communication unit 12 to receive metadata transmitted from any one of the sensing data providing terminal 2 and the sensing data using terminal 3 that are connected via the network 9 (s1, s2).

Upon receiving user-side metadata transmitted from the sensing data using terminal 3, the matching apparatus 1 registers the user-side metadata received this time in the user-side metadata storage DB 14 (s3), and returns to s1. Also, upon receiving the provider-side metadata transmitted from the sensing data providing terminal 2, the matching apparatus 1 registers the provider-side metadata received this time in the provider-side metadata storage DB 13 (s4), and returns to s1.

In this manner, the matching apparatus 1 accumulatively stores provider-side metadata transmitted from the sensing data providing terminal 2 connected via the network 9 in the provider-side metadata storage DB 13 by executing metadata reception processing shown in FIG. 7. Also, the matching apparatus 1 accumulatively stores, in the user-side metadata storage DB 14, user-side metadata transmitted from the sensing data using terminals 3 connected via the network 9.

Figure 8:
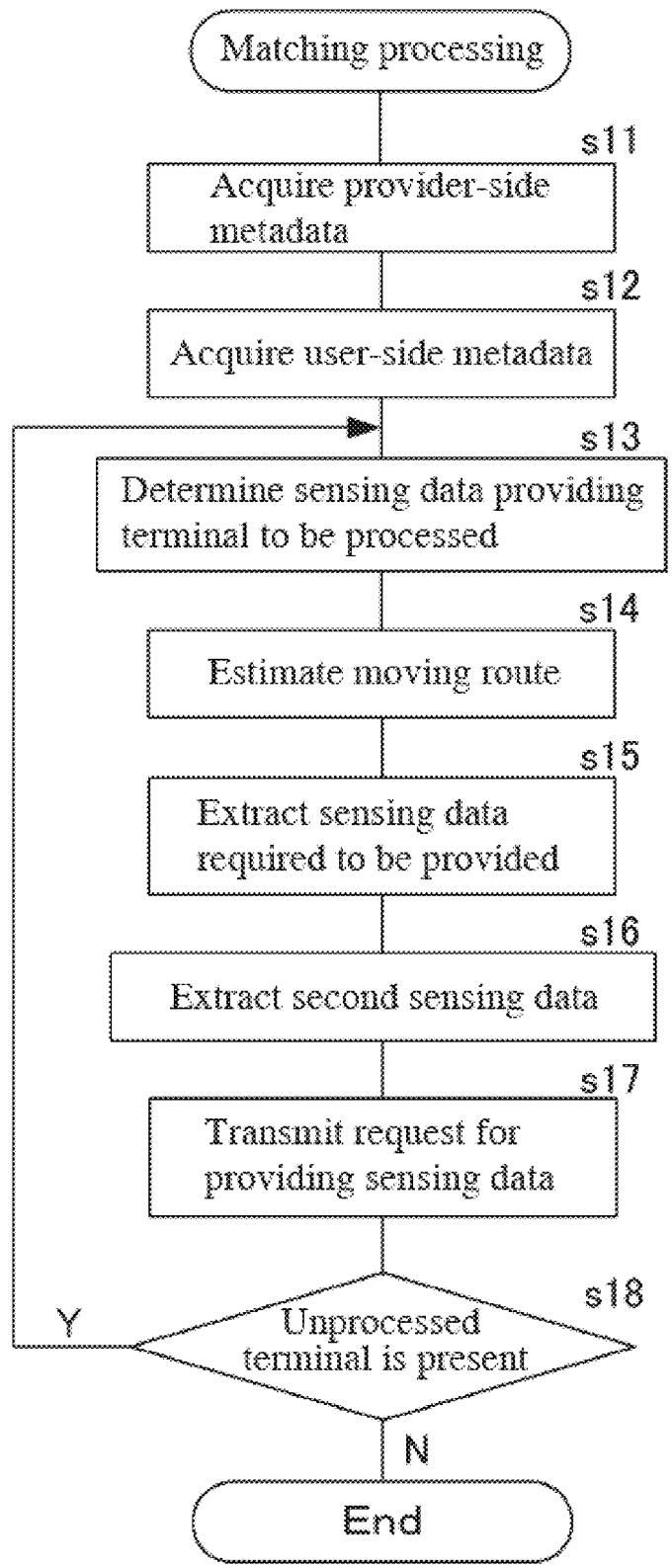
FIG. 8 is a flowchart showing matching processing performed by the matching apparatus.

Next, matching processing performed by the matching apparatus 1 will be illustrated. FIG. 8 is a flowchart showing matching processing performed by the matching apparatus. When a matching timing comes, the matching apparatus 1 executes matching processing shown in FIG. 8. The matching timing may be a predetermined timing, a timing at which a prescribed time period has elapsed from the end of the previous matching processing, a timing at which the user-side metadata was registered in the user-side metadata storage DB 14 in the above-described s3, a timing at which provider-side metadata is registered in the provider-side metadata storage DB 13 in the above-described s4, or a combination of this plurality of timings.

In the matching apparatus 1, the provider-side metadata acquisition part 11a of the control unit 11 acquires the provider-side metadata whose terminal type is mobile and whose start time is the current time or later, from the provider-side metadata registered in the provider-side metadata storage DB 13, as the corresponding provider-side metadata (s11). Also, in the matching apparatus 1, the user-side metadata acquisition part 11b of the control unit 11 acquires the user-side metadata whose sensing data acquisition time is the current time or later from the user-side metadata registered in the user-side metadata storage DB 14, as the corresponding user-side metadata (s12). The above-described order of processing s11 and s12 may also be reversed.

The control unit 11 of the matching apparatus 1 determines the sensing data providing terminal 2 that is to be processed (s13). In s13, the provider-side metadata acquisition part 11a determines the sensing data providing terminal 2 that is to be processed from the sensing data providing terminals 2 that have acquired the provider-side metadata in s11.

In the matching apparatus 1, the matching part 11c of the control unit 11 estimates, on the basis of the provider-side metadata acquired in s11, the moving route of the sensing data providing terminal 2 that was determined to be processed in s13 (s14). Estimation of the moving route in s14 is performed with respect to the moving route from the current position according to the provider-side metadata to the destination using a known navigation function.

It should be noted that, here, although the provider-side metadata is data that is registered in association with the terminal ID, type, sensing area, start time, destination, moving means, and type of acquirable sensing data, if the destination is not included in the provider-side metadata, it is also possible to estimate the movable range on the basis of the moving means in s14. Also, if the moving means is not included in the provider-side metadata either, it is also possible to estimate the movable range using a prescribed moving speed (e.g. 5 or 7 kilometers per hour) in s14. Furthermore, if the start time is not included in the provider-side metadata either, it is also possible to set the current time as the start time, and estimate the movable range in s14.

In the matching apparatus 1, the matching part 11c of the control unit 11 performs extraction of sensing data whose provision is requested from the sensing data providing terminal 2 that is processed on the basis of the moving route estimated in s14 (s15). The population used in extraction of the sensing data that is requested to be provided in s15 is the sensing data indicated by the user-side metadata that was read out in s12.

The matching apparatus 1 extracts the sensing data that satisfies all the three conditions (1) to (3) listed below, as the sensing data that is requested to be provided.

(1) The sensing data providing terminal 2 has the necessary function for acquiring the sensing data of the type that is indicated by the user-side metadata.

(2) The shortest distance between the acquisition position of the sensing data indicated by the user-side metadata and the moving route estimated in s14 is less than or equal to a first setting distance (e.g. 30 to 50 m).

(3) The difference in time between the passing or arriving time to the point that is on the moving route estimated in s14 and is the point, where the distance from the acquisition position of the sensing data indicated by the user-side metadata is shortest, and the acquisition time of the sensing data indicated by the user-side metadata is within a first setting time period (e.g. 5 to 10 minutes).

Figure 9A:
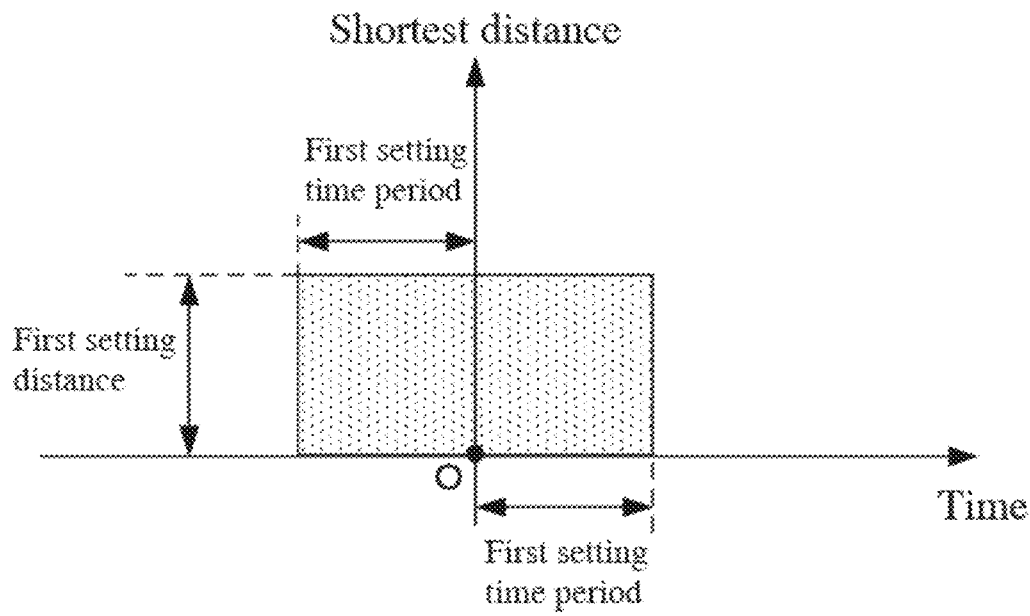
FIGS. 9A and 9B are diagrams illustrating processing for extracting sensing data which is requested to be provided.

In the two-dimensional coordinates of the time and the shortest distance shown in FIG. 9A, where the origin O is set to (sensing data acquisition time, sensing data acquisition position) indicated by the user-side metadata, the conditions shown in (2) and (3) are determined to be satisfied if the moving route estimated in s14 passes through the hatched region. In other words, the conditions shown in (2) and (3) are determined to be not satisfied if the moving route estimated in s14 does not pass through the hatched region shown in FIG. 9A.

The first setting distance and the first setting time period may be set in the matching apparatus 1 in advance, included in the user-side metadata or the provider-side metadata.

The sensing data extracted in s15 includes data that requests the owner or the like of the sensing data providing terminal 2 that is to be processed, to take a bit of detour, move in a bit of hurry, wait for a little while, or the like, in order to acquire the data.

In the matching apparatus 1, the matching part 11c of the control unit 11 extracts, from among the sensing data extracted in s15, the sensing data that can be acquired with little effort by the owner of the sensing data providing terminal 2 that is to be processed (sensing data that can be acquired by taking only a little detour, moving in no hurry, and with little wait time) (s16). Here, the sensing data that is extracted in s15 but is not extracted in s16 is called second sensing data. Here, the sensing data that is extracted in s16 is called first sensing data.

In s16, the sensing data that satisfies the conditions (a) and (b) shown below is extracted.

(a) The shortest distance between the sensing data acquisition position indicated by the user-side metadata and the line indicating the moving route estimated in s14 is less than or equal to a second setting distance (e.g. 5 to 10 m) that is shorter than the first setting distance.

(b) The difference in time between the passing or arriving time at a point that is on the moving route estimated in s14, and whose distance of the point from the sensing data acquisition point indicated by the user-side metadata is shortest, and the sensing data acquisition time indicated by the user-side metadata is within the first setting time period (e.g. 1 to 2 minutes).

Figure 9B:
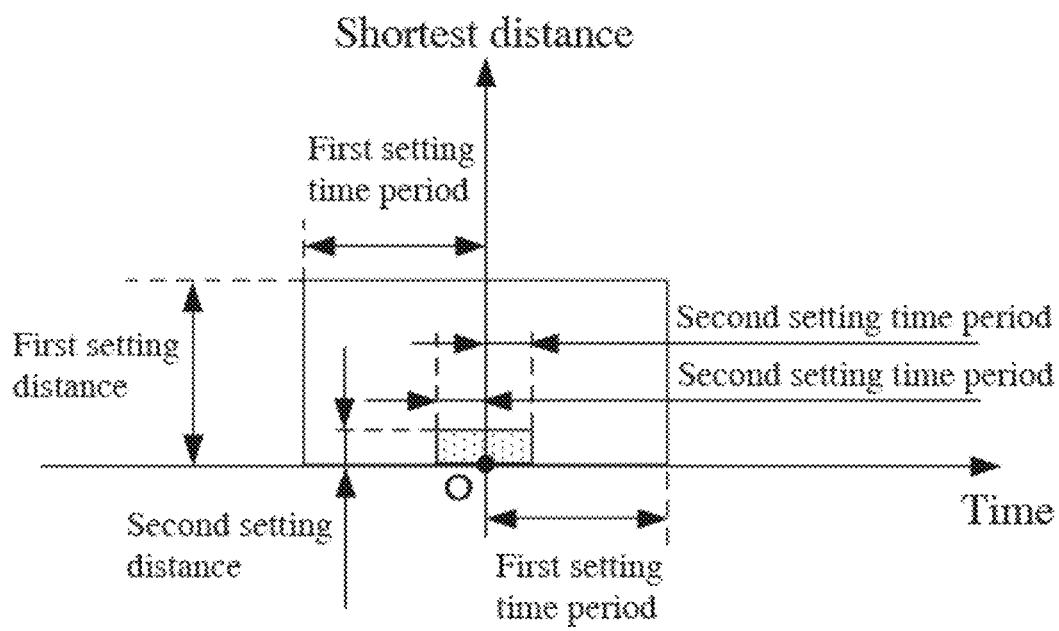

In the two-dimensional coordinates of the time and the shortest distance shown in FIG. 9B, where the origin O is set to (sensing data acquisition time, sensing data acquisition position) indicated by the user-side metadata, if the moving route estimated in s14 passes through the hatched region, the conditions shown in (a) and (b) are determined to be satisfied. In other words, the conditions shown in (a) and (b) are determined to be not satisfied if the moving route estimated in s14 does not pass through the hatched region shown in FIG. 9B.

The second setting distance and the second setting time period may also be set in advance by the matching apparatus 1, or included in the user-side metadata or the provider-side metadata.

In the matching apparatus 1, the request part 11d of the control unit 11 causes the communication unit 12 to transmit, to the sensing data providing terminal 2 that is to be processed, a request for providing the sensing data that was extracted in s15 (s17). The request for providing sensing data that is to be transmitted to the sensing data providing terminal 2 in s17 is data in which the flags indicating the acquisition position, acquisition time, type, whether it is the first sensing data or the second sensing data are associated with each sensing data that is required to be provided.

The matching apparatus 1 determines whether a sensing data providing terminal 2 on which the above processing s13 to s17 has not been executed is present (s18) in the sensing data provider-side metadata terminals 2 whose provider-side metadata was acquired in s11, and if an unprocessed sensing data providing terminal 2 is present, the processing returns to s13. Also, if an unprocessed sensing data providing terminal 2 is not present, the matching apparatus 1 ends the matching processing.

Figure 10:
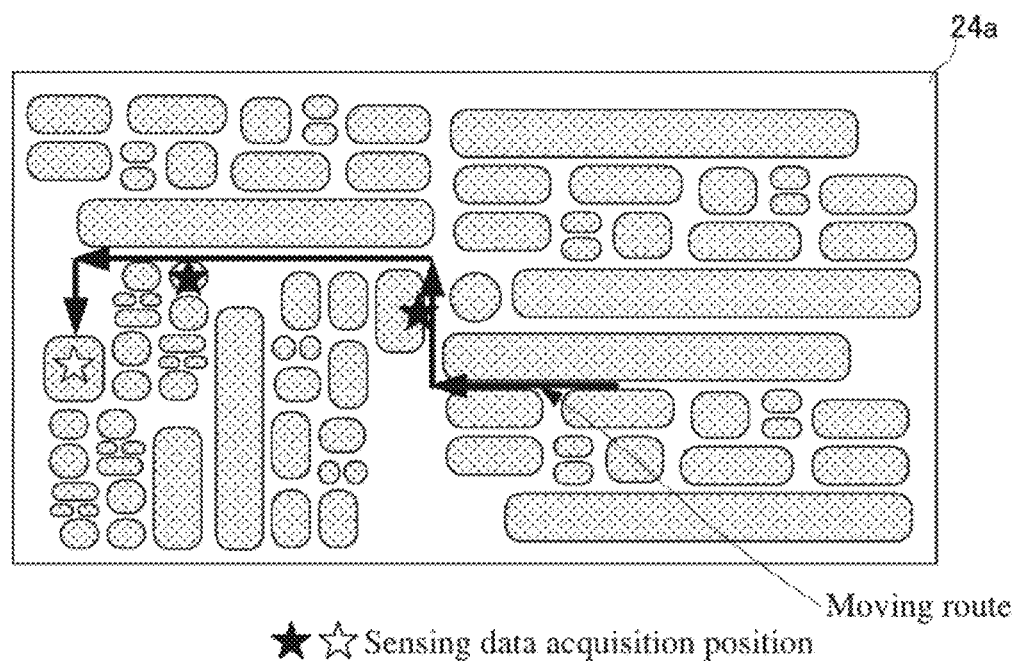
FIG. 10 is a diagram showing an example of a screen displayed in a sensing data providing terminal, regarding a request for providing sensing data.

Next, the operation of the sensing data providing terminal 2 that has received the request for providing the sensing data from the matching apparatus 1 will be described. In the sensing data providing terminal 2, upon receiving a prescribed input operation in the input/operation unit 25, the display unit 24 displays, on the display device 24a, a screen indicating the request for providing the sensing data received from the matching apparatus 1. FIG. 10 is a diagram showing an example of a screen indicating a request for providing sensing data, displayed in a sensing data providing terminal.

As shown in FIG. 10, the sensing data providing terminal 2 displays, on the display device 24a, a screen in which the owner's moving route in response to the request for providing the sensing data is indicated on a map. Also, in this screen, star-shaped marks are displayed at positions where the acquisition of sensing data is requested. Star-shaped marks indicating the acquisition positions of second sensing data are colored white, and star-shaped marks indicating acquisition positions of first sensing data are colored black. FIG. 10 is an example of a screen displayed in a case where there are three pieces of sensing data whose acquisition is requested, one is second sensing data, and the other two are first sensing data. The displayed marks are just examples, and they may also be other marks.

Furthermore, when the operation to select any one of the star-shaped marks indicating the acquisition positions of the sensing data is performed in a state where the screen shown in FIG. 10 is displayed, the sensing data providing terminal 2 displays the user-side metadata (the acquisition time, acquisition position, type, contents, and the like) regarding the sensing. In this manner, the owner of the sensing data providing terminal 2 can recognize the detail of the sensing data whose provision is requested. Also, since first sensing data and second sensing data are separately displayed, the owner of the sensing data providing terminal 2 can easily confirm whether it is sensing data (first sensing data) that can be smoothly acquired when moving, or sensing data (second sensing data) that requires a bit of effort (e.g. taking a bit of a detour, moving in a bit of hurry, waiting for a little while, or the like) in order to acquire the data when moving.

Note, that the sensing data providing terminal 2 may also display the user-side metadata regarding the sensing data whose provision is requested to be provided on the screen shown in FIG. 10.

Figure 11:
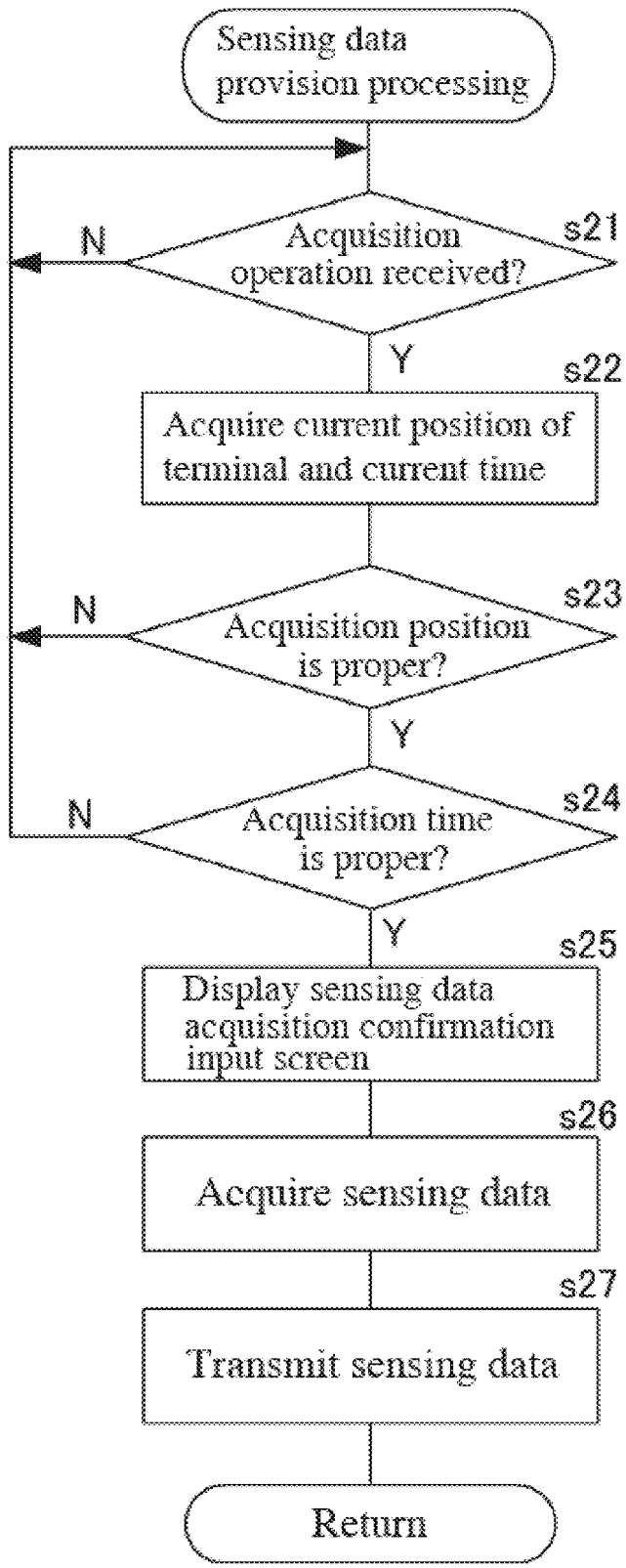
FIG. 11 is a flowchart showing sensing data providing processing performed by the sensing data providing terminal.

Next, processing performed by the sensing data providing terminal 2 for acquiring the sensing data whose provision is requested and providing the acquired sensing data, will be described. FIG. 11 is a flowchart showing sensing data providing processing performed by the sensing data providing terminal. Upon the input/operation unit 25 receiving an operation for acquisition of any of the sensing data whose provision is requested from the matching apparatus 1, the sensing data providing terminal 2 acquires its current position and the current time (s21, 22). The current position of the terminal can be acquired from the GPS sensor 23a.

The sensing data providing terminal 2 determines whether the acquisition position and acquisition time of the sensing data for which the operation for acquisition was received in s21 are proper (s23, s24). If the position of the terminal acquired in s22 is within the range of a couple of meter radius (1 to 2 m) centering on the acquisition position of the sensing data for which the operation for acquisition was received in s21, the sensing data providing terminal 2 determines that the acquisition position is proper. If the current time acquired in s22 is within the time range of a couple of minutes (or about 1 min) before and after the acquisition time of the sensing data of which the operation for acquisition was received in s21, the sensing data providing terminal 2 determines that the acquisition time is proper.

If it is determined that at least one of the acquisition position and the acquisition time of the sensing data is not proper, the sensing data providing terminal 2 returns to s21.

Note, that although in this example, if at least one of the acquisition position and the acquisition time of the sensing data of which the operation for acquisition was received in s21 is not proper, the processing returns to s21, it is also possible to use a configuration in which the processing returns to s22, and repeats s22 to s24 until both the acquisition position and the acquisition time of the sensing data of which the operation for acquisition was received in s21 become proper.

When it is determined that both the acquisition position and the acquisition time of the sensing data are proper, the sensing data providing terminal 2 displays a sensing data acquisition confirmation input screen on the display device 24a (s25). This sensing data acquisition confirmation input screen is a screen for guiding the operation for acquisition of the sensing data for which an operation for acquisition was received in s21.

Figure 12:
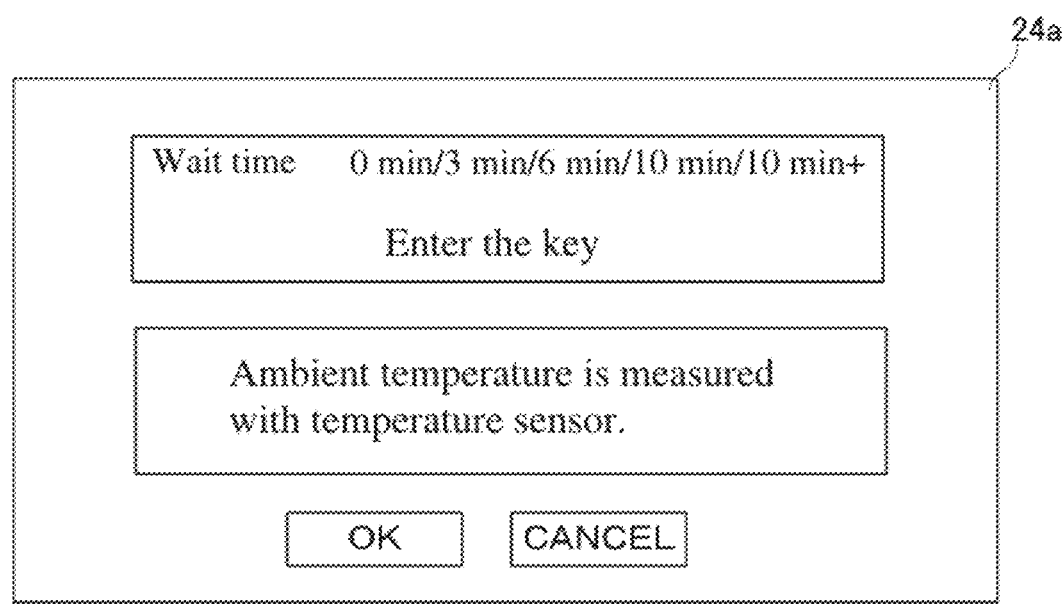
FIG. 12 is a diagram showing an example of a sensing data acquisition confirmation input screen that is displayed in a sensing data providing terminal.

FIG. 12 is a diagram showing the sensing data acquisition confirmation input screen. FIG. 12 shows the sensing data acquisition confirmation input screen regarding a request for providing sensing data regarding the wait time and the ambient temperature at a reception counter of a facility. The wait time at the reception counter of the facility is five-sense data and the ambient temperature is sensing data obtained by a temperature sensor.

The owner of the sensing data providing terminal 2 performs the input operation for acquiring the sensing data with the input/operation unit 25 in accordance with the sensing data acquisition confirmation input screen displayed in s25. In the example shown in FIG. 12, if the sensing data that was requested to be provided is to be acquired, the owner of the sensing data providing terminal 2 presses down the OK button. If the sensing data that was requested to be provided is not to be acquired, the owner of the sensing data providing terminal 2 presses down the CANCEL button.

The sensing data providing terminal 2 acquires the sensing data in accordance with the input operation for acquisition of the sensing data (s26). In order to acquire five-sense data, the sensing data providing terminal 2 receives the input operation performed by the owner. The sensing data providing terminal 2 transmits the sensing data acquired in s26 to the sensing data management apparatus 4 via the network 9 (s27), and returns to s21. The sensing data to be transmitted in s27 is associated with information such as the acquisition position, the acquisition time, the type, and the content of this sensing data.

The sensing data management apparatus 4 stores the sensing data transmitted from the sensing data providing terminal 2 in the sensing data storage DB 43. Also, if the sensing data transmitted from the sensing data providing terminal 2 is transmitted in response to the request for use from any of the sensing data using terminals 3, the sensing data management apparatus 4 transmits the sensing data received this time to the corresponding sensing data using terminal 3.

In this manner, with the matching system according to this example, it is possible to effectively use the sensing data providing terminal 2, which is a terminal such as a mobile terminal or moving terminal, to acquire the sensing data requested from the sensing data using terminal 3. Accordingly, even in a situation where sensors that can provide sensing data that satisfies the user's needs are not installed, sensing data that satisfies the user's needs can be provided.

Also, the determination in s23 and s24 may also be performed by the matching apparatus 1 instead of the sensing data providing terminal 2. In this case, it is preferable to use a configuration in which, even when the acquisition position and acquisition time are proper, if another sensing data providing terminal 2 has already acquired the corresponding sensing data, the matching apparatus 1 does not cause the sensing data providing terminal 2 to execute processing in s25 and onward. In this manner, it is possible to prevent the owner of the sensing data providing terminal 2 from unnecessarily performing the operation for acquiring sensing data.

Furthermore, it is also possible to use a configuration in which points are given to the owners of the sensing data providing terminals 2 for provision of the sensing data. The points can be used for settlement of the amount for use in the sensing data in this system, for example. In this manner, it is possible to promote the owners of the sensing data providing terminals 2 to provide the sensing data. Especially, by setting the points to be given for the second sensing data greater than the first sensing data, it is possible to suppress the ratio of sensing data that is not provided from any sensing data providing terminals 2 in the sensing data that has been required to be provided.

In addition, although the above example describes that transmission/reception of sensing data via the network 9 is not directly performed between the sensing data providing terminal 2 and the sensing data using terminal 3, a configuration is also possible in which transmission/reception of sensing data via the network 9 is directly performed between the sensing data providing terminal 2 and the sensing data using terminal 3. In this case, the sensing data storage DB 43 can be eliminated from the sensing data management apparatus 4.

Note, that it is also possible to use a configuration in which the matching apparatus 1 has a function of automatically generating the user-side metadata using AI or the like on the basis of usage history or the like of the sensing data.

Note 1

A matching apparatus having at least one hardware processor,
in which the hardware processor
acquires provider-side metadata regarding a first terminal that provides sensing data, the provider-side metadata including at least a current position of the first terminal,
acquires user-side metadata regarding sensing data that is to be used by a second terminal;
performs matching with the user-side metadata using the current position of the first terminal included in the provider-side metadata and the current time, and decides whether to request the first terminal to provide the sensing data, and
requests the first terminal to provide the sensing data in accordance with the decision by matching the provider-side metadata with the user-side metadata.

Note 2

A matching method using at least one hardware processor, the matching method including
acquiring provider-side metadata regarding a first terminal that provides sensing data, the provider-side metadata including at least a current position of a first terminal,
acquiring user-side metadata regarding sensing data that is to be used by a second terminal,
performing matching with the user-side metadata, using the current position of the first terminal included in the provider-side metadata and the current time, and deciding whether to request the first terminal to provide the sensing data, and
requesting the first terminal to provide the sensing data in accordance with the decision by matching the provider-side metadata with the user-side metadata.

INDEX TO THE REFERENCE NUMERALS

1 matching apparatus
2 sensing data providing terminal
3 sensing data using terminal
4 sensing data management apparatus
9 network
11 control unit
11*a* provider-side metadata acquisition part
11*b* user-side metadata acquisition part
11 matching part
11*d* request part
12 communication unit
13 provider-side metadata storage DB
14 user-side metadata storage DB
21 control unit
22 communication unit
23 sensor unit
23*a* GPS sensor
23*b* image sensor
23*c* temperature sensor
23*d* gyro sensor
24 display unit
24*a* display device
25 input operation unit

The invention claimed is:

1. A matching apparatus comprising a processor configured with a program to perform operations comprising:
   operation as a provider-side metadata acquisition part configured to acquire provider-side metadata regarding a first terminal that provides sensing data, the provider-side metadata comprising at least a current position of the first terminal;
   operation as a user-side metadata acquisition part configured to acquire user-side metadata regarding a condition for sensing data that is to be used by a second terminal;
   operation as a matching part configured to make a prediction about whether or not sensing data provided by the first terminal will satisfy the condition in the future by matching the current position of the first terminal and a current time with the user-side metadata, and decide whether or not to request the first terminal to provide the sensing data based on a result of the prediction; and
   operation as a request part configured to request the first terminal to provide sensing data, based on the decision by the matching part.

2. The matching apparatus according to claim 1; wherein the first terminal comprises a second processor configured with a program to perform operations comprising operation as a position measurement part configured to measure a position of the first terminal, and
   the current position of the first terminal included in the provider-side metadata comprises a position of the first terminal measured by the position measurement part.

3. The matching apparatus according to claim 1, wherein the user-side metadata comprises a content of the sensing data, an acquisition position of the sensing data, and an acquisition time of the sensing data, and the processor is configured with the program such that the matching part decides to require the first terminal to provide the sensing data in response to a difference in time being within a first setting time period, wherein the difference in time comprises a difference between:
 a time at which the first terminal reaches a position at which a distance of the first terminal from the sensing data acquisition position included in the user-side metadata is shorter than or equal to a first setting distance; and
 the sensing data acquisition time included in the user-side metadata.

4. The matching apparatus according to claim 3; wherein the processor is configured with the program such that the request part is configured to separately request the first terminal to provide:
 first sensing data in which the difference in time is within a second setting time period which is shorter than the first setting time period, and
 second sensing data other than the first sensing data.

5. The matching apparatus according to claim 3; wherein the processor is configured with the program such that, in response to requesting the first terminal to provide the sensing data as determined by the matching part, the request part notifies the first terminal of a content of the sensing data, an acquisition position of sensing data, and an acquisition time of the sensing data.

6. The matching apparatus according to claim 1, wherein the processor is configured with the program to perform operations further comprising operation as a user-side metadata storage part configured to store user-side metadata regarding sensing data that is to be used by the second terminal, and
 the processor is configured with the program such that the user-side metadata acquisition part reads out the user-side metadata from the user-side metadata storage part.

7. The matching apparatus according to claim 1, wherein the processor is configured with the program to perform operations further comprising:
 operation as a communication unit configured to receive the user-side metadata that is transmitted from the second terminal regarding sensing data that is to be used by the second terminal.

8. The matching apparatus according to claim 1, wherein the provider-side metadata comprises a movement schedule of the first terminal, and
 the processor is configured with the program such that the matching part is configured to perform the matching by further using the movement schedule of the first terminal included in the provider-side metadata, to decide whether or not to request the first terminal to provide the sensing data.

9. A terminal comprising a second processor configured with a program to perform operations comprising:
 operation as a display control part for displaying a screen in accordance with a request from the matching apparatus according to claim 4, for providing sensing data wherein
 the second processor is configured with the program such that the display control part displays a screen in which a request for providing the first sensing data and a request for providing the second sensing data are separate.

10. A sensor network system comprising:
 the matching apparatus according to claim 1, the first terminal, and the second terminal, wherein the matching apparatus, the first terminal, and the second terminal are connected to one another via a network so that they can communicate digitally with each other.

11. The matching apparatus according to claim 4; wherein the processor is configured with the program such that, in response to requesting the first terminal to provide the sensing data as determined by the matching part, the request part notifies the first terminal of a content of the sensing data, an acquisition position of sensing data, and an acquisition time of the sensing data.

12. The matching apparatus according to claim 2, wherein the provider-side metadata comprises a movement schedule of the first terminal, and
 the processor is configured with the program such that the matching part is configured to perform the matching by further using the movement schedule of the first terminal included in the provider-side metadata, and to decide whether or not to request the first terminal to provide the sensing data.

13. The matching apparatus according to claim 3, wherein the provider-side metadata comprises a movement schedule of the first terminal, and
 the processor is configured with the program such that the matching part is configured to perform the matching by further using the movement schedule of the first terminal included in the provider-side metadata and to decide whether or not to request the first terminal to provide the sensing data.

14. The matching apparatus according to claim 4, wherein the provider-side metadata comprises a movement schedule of the first terminal, and
 the processor is configured with the program such that the matching part is configured to perform the matching by further using the movement schedule of the first terminal included in the provider-side metadata, and to decide whether or not to request the first terminal to provide the sensing data.

15. The matching apparatus according to claim 5, wherein the provider-side metadata comprises a movement schedule of the first terminal, and
 the processor is configured with the program such that the matching part is configured to perform the matching by further using the movement schedule of the first terminal included in the provider-side metadata, and to decide whether or not to request the first terminal to provide the sensing data.

16. The matching apparatus according to claim 6, wherein the provider-side metadata comprises a movement schedule of the first terminal, and
 the processor is configured with the program such that the matching part is configured to perform the matching by further using the movement schedule of the first terminal included in the provider-side metadata, and to decide whether or not to request the first terminal to provide the sensing data.

17. The matching apparatus according to claim 7, wherein the provider-side metadata comprises a movement schedule of the first terminal, and
 the processor is configured with the program such that the matching part is configured to perform the matching by further using the movement schedule of the first terminal included in the provider-side metadata, and to decide whether or not to request the first terminal to provide the sensing data.

18. A matching method wherein a computer executes steps comprising:

acquiring provider-side metadata regarding a first terminal that provides sensing data, the provider-side metadata comprising at least a current position of the first terminal, acquiring user-side metadata regarding condition for sensing data that is to be used by a second terminal, making a prediction about whether or not sensing data provided by the first terminal will satisfy the condition in the future by matching the current position of the first terminal and a current time with the user-side metadata, and deciding whether or not to request the first terminal to provide the sensing data based on a result of the prediction, and requesting the first terminal to provide the sensing data in accordance with the decision in the matching step.

19. A non-transitory computer-readable storage medium storing a matching program for causing a computer to execute operations comprising:

acquiring provider-side metadata regarding a first terminal that provides sensing data, the provider-side metadata comprising at least a current position of the first terminal, acquiring user-side metadata regarding condition for sensing data that is to be used by a second terminal, making a prediction about whether or not sensing data provided by the first terminal will satisfy the condition in the future by matching the current position of the first terminal and a current time with the user-side metadata, and deciding whether or not to request the first terminal to provide the sensing data based on a result of the prediction, and requesting the first terminal to provide the sensing data in accordance with the decision in the matching step.

* * * * *